Figure 1:
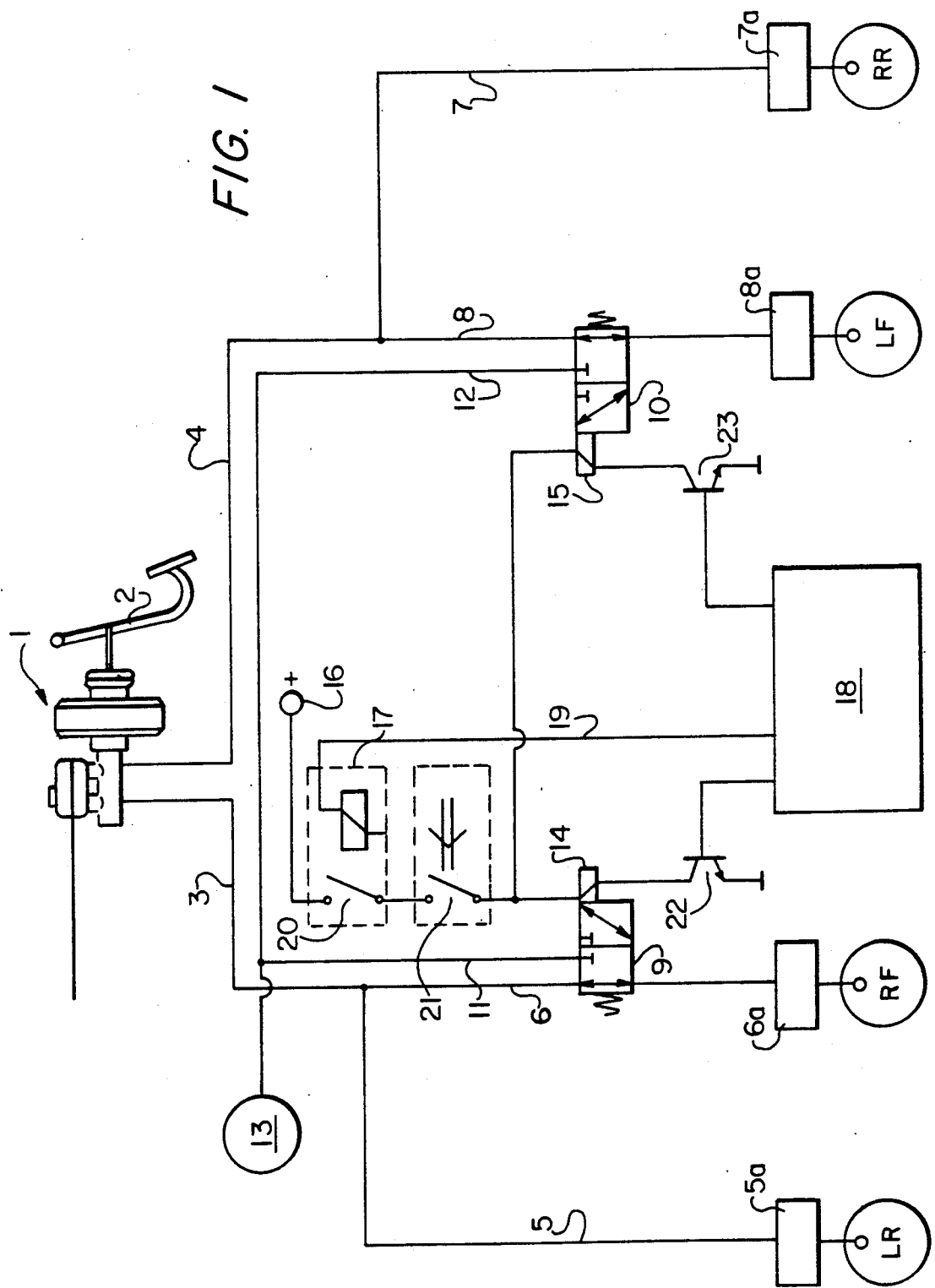

United States Patent [19]

Sterler

[11] Patent Number: 5,092,436
[45] Date of Patent: Mar. 3, 1992

[54] ANTI-WHEEL SLIPPING DEVICE FOR DRIVE AXLES PROVIDED WITH DIFFERENTIAL GEARING

[75] Inventor: Georg Sterler, Grossmehring, Fed. Rep. of Germany

[73] Assignee: Audi AG, Ingolstadt, Fed. Rep. of Germany

[21] Appl. No.: 539,575

[22] Filed: Jun. 18, 1990

[30] Foreign Application Priority Data

Jun. 23, 1989 [DE] Fed. Rep. of Germany ....... 3920608

[51] Int. Cl.$^5$ .......................... B60K 41/26; B60T 8/34
[52] U.S. Cl. ..................................... 192/4 A; 475/86; 475/150; 180/197; 364/426.03
[58] Field of Search ................. 192/4 A; 475/86, 150, 475/224; 180/197; 364/426.03

[56] References Cited

U.S. PATENT DOCUMENTS

| | | | |
|---|---|---|---|
| 3,788,166 | 1/1974 | Hart et al. | 475/86 |
| 4,218,938 | 8/1980 | Hattori | 475/150 X |
| 4,412,459 | 11/1983 | Goscenski, Jr. | 475/86 |
| 4,644,823 | 2/1987 | Mueller | 475/86 |
| 4,766,972 | 8/1988 | Takata et al. | 180/197 |

Primary Examiner—Richard Lorence
Attorney, Agent, or Firm—Lalos & Keegan

[57] ABSTRACT

The invention relates to a device for the prevention of slippage on one side of a wheel on a motor vehicle driving axle with differential gearing. The device contains a sensor unit for detection of the slippage of a driving wheel and an electronic processing and control unit installed downstream. By means of an actuating element, braking or locking of a rotating part of the drive system can be effected, the actuating element being capable of being triggered by means of an electric control line. There is provided in this control line a mechanically actuatable switch that can be actuated as a function of the engine transmission position and that is deactivated when higher drive speed ranges are engaged. As a result, the device for prevention of slippage on one side, especially brake application on one side, can be activated by the safety switch as a starting assistance in performing a cross-lock function only at low speeds, preferably in first gear or first transmission speed range. Consequently, malfunctions in the electronic circuit at higher speeds in particular cannot result in hazardous and uncontrollable driving conditions.

10 Claims, 2 Drawing Sheets

ANTI-WHEEL SLIPPING DEVICE FOR DRIVE AXLES PROVIDED WITH DIFFERENTIAL GEARING

This invention relates to a device for preventing slippage of a wheel of a motor vehicle drive axle with differential gearing. Such devices perform what is known as a cross-lock function and, depending on the design, are used as a starting assistance or as a drive slip regulating element or as a combination of both of such functions.

In prior art devices, the slipping of a driven wheel in its drive direction is detected and recorded by means of sensors. To prevent slipping in the drive direction, the wheel is braked by means of a respective brake, for which purpose braking pressure is increased in the respective brake line by means of a control line and a controllable hydraulic valve until the wheel is no longer slipping in the drive direction.

In its primary function, such type of device serves as a starting assistance. As is known, the two wheels on a driving axle are connected to each other by an equalizing gear or differential gear to equalize the different paths traveled. If one wheel is positioned on a smooth surface and spins, virtually no additional torque is transmitted to the other wheel, so that the vehicle cannot start moving. If now the slipping wheel is braked by means of the device, the action of the latter is similar to that of a differential lock and torque can be transmitted to the stationary wheel. In many instances the vehicle can thereby be set in motion. In a secondary function, the device operates during travel, that is, when the vehicle is already in motion, as a drive slip regulator to improve driving stability. During travel operation, as well, a wheel slipping in the direction of drive is detected by sensors and is braked by operation of a brake to a noncritical value at which slipping does not occur. It is thus apparent that the device must be capable of acting separately on each driven wheel.

In the event of a malfunction in the steering of the vehicle, the danger exists that a wheel may be braked unexpectedly on one side. Such a condition would render a vehicle uncontrollable at high speeds. A high investment in safety devices and redundant elements is obviously necessary in order to prevent such a danger to the greatest extent possible.

In addition, a drive slip regulator is known for mobile operation of a vehicle (i.e., without starting assistance in the form of application of a brake on one side). A driven wheel slipping in the direction of drive during mobile operation is thereby detected and excess engine momentum is decreased by closing a throttle valve. A very quick acting throttle valve with closing times in the 30 millisecond range is required in order for such an arrangement to function satisfactorily. Even in the event of steering malfunctions, such a device does not result in any uncontrollable driving conditions in that in a worse case scenario only the engine output is throttled down for a prolonged period.

Another state of the art device comprises brake application on one side as a starting assistance, a drive slip regulator being actuated by means of brake application in mobile operation at low speeds, as well. Above a certain speed value, on the other hand, the brake application function for drive slip regulation is disengaged. In this higher speed range, drive slip is regulated by means of automatic throttle valve control by reducing excess engine momentum, as described in connection with the aforementioned second state of the art device. In the event of malfunction in the control system, the danger of spontaneous braking on one side exists in the lower speed range. Since the switching depends at a given speed on the functioning of brake application in the throttle valve control function, also by means of the control system, errors are possible here as well, so that even at higher speeds the danger of braking on one side can occur and result in uncontrollable driving conditions. Consequently, labor intensive and costly safety systems are also required in the case of this device.

State of the art safety devices consist of two processors in an electronic control unit that supervise and monitor each other. But even in such circumstances, a residual risk persists as a result of known disruptive effects such as stray electromagnetic fields, failure of a processor, etc.

A blade actuated catch on the differential gear for a driven front axle is also known as an alternative to brake application on one side. Such a catch is approximately 10 times more costly than the solution involving brake application on one side. Inasmuch as only equalization of the path of the driving wheels no longer takes place in the event of a malfunction and consequent engagement of the catch, although the vehicle remains relatively easily controllable, some automotive manufacturers prefer the more expensive blade actuated catch to the riskier solution involving brake application on one side. At high speeds, considerable danger nevertheless exists even in these circumstances if an engaged catch closes inadvertently or does not release, as a result of a malfunction.

Accordingly, it is the principal object of the present invention to provide for a safer operation of a generic device for preventing slippage of a wheel of a motor vehicle driving axle having differential gearing.

This objective is achieved by means of a device including a sensor unit for detection of slippage of a driving wheel and an electronic processing and control unit installed downstream. Connected to this processing and control unit is an actuating element by means of which a rotating part of the drive system can be deterred or locked. This rotating part may be either a slipping wheel or a rotating part in he differential gearing. What is essential is that a cross-locking effect is applied on the driving wheels. The actuating element is connected to the processing and control unit by means of an electric control in an actuating element circuit.

The invention provides for introducing into this control line or in the actuating element circuit a mechanically actuatable switch that can be actuated as a function of the engine gear position and that is open when higher gear speeds or higher transmission ranges are engaged.

The advantage provided by the invention is that a mechanical safety feature and mechanical redundancy are created immediately upstream from the actuating element by way of a mechanically actuatable switch, in that the cross-locking effect cannot be activated over the control line at higher critical speeds that can be reached only at higher gear speeds or in higher transmission ranges. This mechanical safety feature operates under all conditions, even when malfunctions in the electronic system cause control pulses to be transmitted to the actuating element. Uncontrollable driving conditions at higher speeds as a result of unexpected brake application on one side are thus eliminated and the overall safety of the device is improved. The mechanical safety device of the invention operates in particular even if the safety switches and redundancies in the electronics malfunction.

It is emphasized that the existence of a possibility of braking on one side in a vehicle represents an extremely hazardous safety condition and that a very simple and extremely effective solution for overcoming this problem is provided by the present invention.

In another embodiment of the present invention, provision is made for closing of the switch as a function of the first gear or first transmission range, and opening it in all other gears and ranges. This feature assures that brake application on one side or other locking effect can occur, if at all, only at the very low speeds of first gear and the first transmission range, in which no highly dangerous and uncontrollable driving conditions can occur.

In the event of the use of a manually operated transmission, it is preferable to actuate the switch directly over a movable part of the transmission, thus assuring reliable actuation.

In the event of the use of an automatic transmission, it is provided that the safety switch be embodied in at least one manometric switch in the hydraulic range. As is known, the controlled transmission speed ranges in an automatic transmission are sensed by corresponding hydraulic pressure ranges. The first transmission range can be sensed by means of this pressure range, for example, and the manometric switch actuated. In another embodiment of an automatic transmission, the first transmission range engaged can be sensed by the presence of a specific pressure in a hydraulic range while no pressure is built up in another hydraulic range. It is also simple to sense such a condition by means of two manometric switches in the pertinent ranges; the safety switch can be connected in a series arrangement of these manometric switches, e.g., a closing switch and an opening switch.

Anti-locking systems increasingly are becoming the standard in more expensive motor vehicles. In an anti-locking system there are sensors and a processing and control unit whereby the locking of one or more wheels relative to other wheels is detected. These already existing units may also be used with slight modifications to sense slipping of a driving wheel or drive slippage during mobile operation Another embodiment of the invention contemplates the integration of the system as described with an anti-locking system to the extent possible.

According to another embodiment of the invention, the device is actuated by a blade operated interlock as a differential interlock that is operated by an actuating element such as an electromagnetic or electric motor. By means of the switch as described in the control line of the actuating element, this switch being controlled as a function of the transmission speed range, the differential interlock may be engaged at a low driving speed, e.g., one corresponding to the first transmission speed range, in which critical and hazardous driving conditions cannot occur even in a front-wheel drive arrangement.

In a further embodiment of the invention, the device operates in a cross-lock function by means of brake application. For this purpose, solenoid valves are provided as actuating elements associated with the driven wheels, such valves being mounted in the applicable brake lines and being connected to a pressure source. In the event of a wheel slipping on one side, a control pulse is sent by the drive electronics to the associated solenoid valve, as a result of which the valve closes off the brake line to the master brake cylinder and takes pressure from the pressure source and applies it to the pertinent brake. If the switch as described is installed in the control line to the solenoid valves, i.e., in the actuating element circuit, the safety related cross-lock function can occur only at the lower speeds, such as the first transmission range, in which the vehicle incurs no excessively dangerous conditions even in the event of malfunctions.

A particularly preferable embodiment is provided by supplementing with a drive slip regulator in the aforementioned embodiment of a cross-lock function with brake application in the first transmission range and a safety feature provided by the mechanically actuatable switch. The drive slip regulator provided in such embodiment operates by means of a quick acting throttle valve control that instantaneously reduces excess engine momentum in the event of drive slippage. As previously mentioned, such a drive slip regulator is rendered noncritical from the view point of safety by the principle applied. Starting assistance, which cannot be effected with such a drive slip regulator, is achieved by means of the brake application as described above, which, however, is, of course, discontinued at higher speeds.

Figure 2:
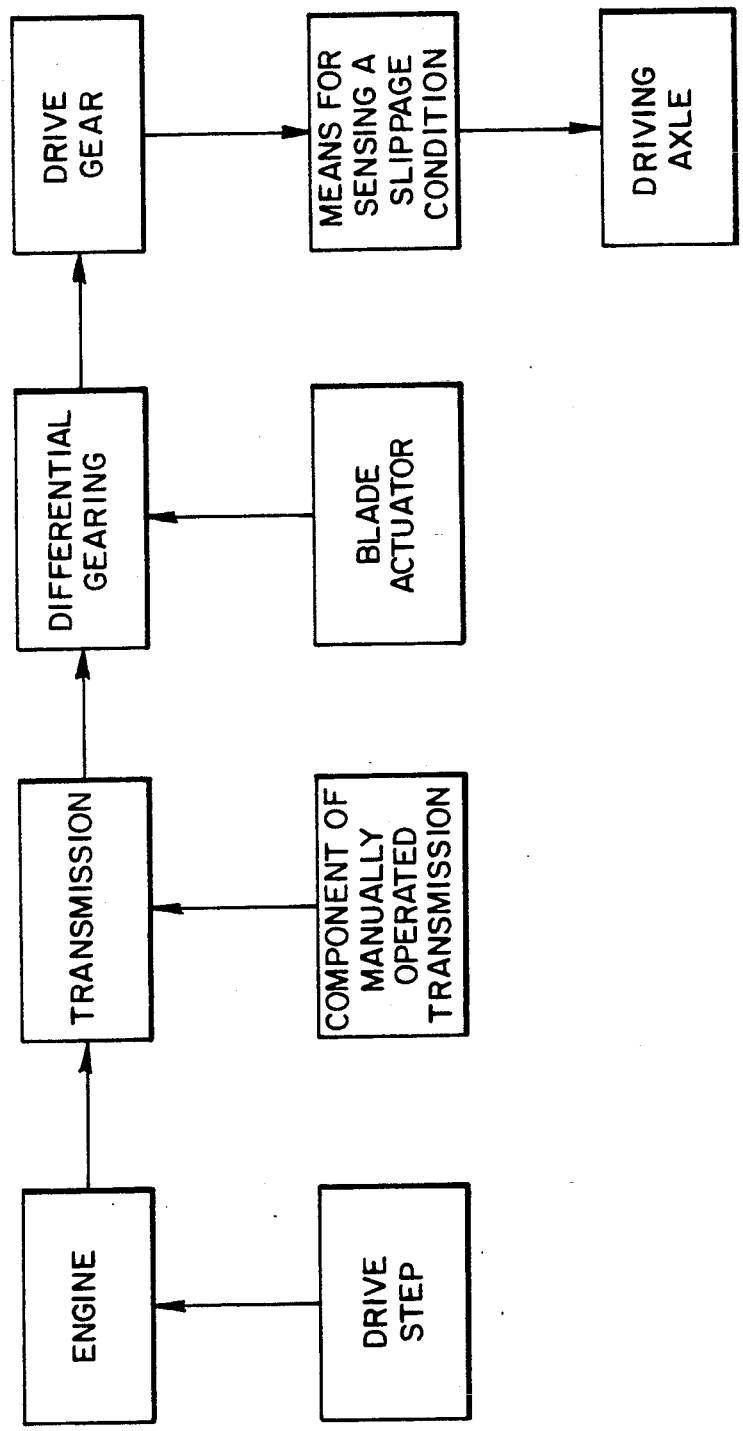

Other objects and advantages of the present invention will become more apparent to those persons having ordinary skill in the art to which the present invention pertains from the following description taken in conjunction with FIG. 1 of the accompanying drawing which illustrates diagrammatic-schematic representation of an embodiment of the invention and FIG. 2 which illustrates a diagrammatic-schematic representation of the drive system of the present invention.

Referring to FIG. 1 of the drawing, there is illustrated an embodiment of the invention including a brake master cylinder 1 with a brake pedal 2, from which two hydraulic brake lines 3 and 4 lead to a diagonal braking system of a motor vehicle. The brake line 3 branches off into a brake line 5 leading to the brake fluid cylinder 5a on the left rear (LR) wheel and into a brake line 6 leading to the brake fluid cylinder 6a of the right front (RF) wheel. The brake line 4 branches off correspondingly into a brake line 7 leading to a brake fluid cylinder 7a on the right rear (RR) wheel and into brake fluid line 8 leading to a brake cylinder 8a on the left front (LF) wheel.

The vehicle involved here is a front wheel drive vehicle, so that, if the starting conditions are unfavorable, either the right front or the left front wheel may slip because of the differential gearing. To achieve a cross-lock condition in which t is undesirable action of the differential gearing is eliminated, the slipping wheel can be braked. Solenoid valves 9 and 10 are installed for this purpose in the brake lines 6 and 8 leading to the front drive wheels. Under the conditions illustrated in the drawing, these solenoid valves have not been actuated, they merely provide an unobstructed passage for the brake lines 6 and 8. Under such conditions, the braking force applied to the brake pedal 2 by the driver acts on all four brake cylinders in accordance with conventional brake operation.

If one of the valves 9 or 10 is triggered, the triggered valve blocks the associated brake line to the brake master cylinder and connects a path to another hydraulic line 11 or 12. The hydraulic lines 11 and 12 are connected to a pressure source 13. Such pressure source 13 is already present, for example, if there is an anti-locking system, and may be used for the present purposes.

Upon actuation of one of valves 9 or 10, pressure is automatically delivered from the pressure source 13 to the associated brake cylinder and the corresponding wheel is automatically braked. As a result, torque can be applied to the other drive wheel to set the vehicle in motion.

The valves 9 or 10 are controlled by energization of electromagnetics 14 or 15. Valve relay 17 is connected to the positive terminal of a battery as at 16. This valve relay 17 is triggered by the electronics 18 of an anti-locking system by means of an electric line 19. During operation, the valve relay 17 is normally energized so that its switch element 20 normally is in the closed position. Only if the electronics 18 detects an error in itself is the valve relay 17 operated so as to be deenergized to open switch 20.

Because of the sensors, comparator units and control units already present in an anti-locking system for detection of locking and slipping conditions of a wheel, the present device for brake application as a starting assistance with cross-lock function is integrated into an anti-locking system. That is to say, the electric triggering pulse is also applied to the four conventional control valves of the anti-locking system for specific execution by means of valve relay 17.

Beyond valve relay 17 there is provided in series a safety switch 21 which is adapted to be closed mechanically when the first gear of a manual transmission or the first speed range of an automatic transmission is engaged. The safety switch 21 is open in all other gears and transmission drive ranges. It is to be noted that under such conditions, the relay circuits to the electromagnets 14 and 15 are always interrupted, i.e., the solenoid valves 9 and 10 cannot be energized.

In the event one of the front drive wheels slips on one side, such condition is detected by the electronics 18 and, by way of the schematically represented transistor circuit 22 or 23, the corresponding circuit to the magnets 14 or 15 is closed, provided that the safety switch 21 is also closed. As a result, the corresponding solenoid valve 9 or 10 is actuated and the associated wheel is braked to improve starting operation. The operation described continues until shifting into a higher transmission drive range takes place and the safety switch is thereby opened.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

I claim:

1. In a motor vehicle having an engine, a transmission operable in selected modes and a driving axle provided with differential gearing, a device for preventing slippage of a wheel of said driving axle comprising:

means for sensing a slippage condition of a driving gear of said differential gearing;

a valve normally deactivated and operable upon activation thereof for supplying fluid under pressure to a fluid cylinder of a brake mechanism of said wheel for deterring said slippage condition;

an electronic processing and control unit responsive to detection by said sensing means of said slippage condition for actuating said valve when activated; and a mechanically actuated switch operatively connected to said transmission and responsive to said selected modes of said transmission for activating said valve, said mechanically activated switch being directly operable on said valve.

2. A device according to claim 1 wherein said switch is operatively connected to a manually operated transmission and is responsive to a first gear speed thereof.

3. A device according to claim 1 wherein said switch is operatively connected to a manually operated transmission and is responsive to a second gear speed thereof.

4. A device according to claim 1 wherein said switch is operatively connected to an automatic transmission and is responsive to a first transmission range thereof.

5. A device according to claim 1 wherein said switch is operatively connected to an automatic transmission and is responsive to a second transmission range thereof 6. A device according to claim 1 wherein said switch is mechanically activated by engagement of a component of a manually operated transmission disposed in a preselected position.

7. A device according to claims 1 or 2 wherein said sensing means and said electronic processing and control unit are integrated into the circuitry of an anti-locking brake system.

8. A device according to claim 1 including a drive slip regulator provided with a quick-acting throttle valve operable to rapidly decrease excess engine momentum.

9. In a motor vehicle having an engine, a transmission operable in selected modes and a driving axle provided with differential gearing, a device for preventing slippage of a wheel of said driving axle comprising:

means for sensing a slippage condition of a drive gear of said differential gearing;

a valve normally deactivated and operable upon activation thereof for supplying fluid under pressure to a fluid cylinder of a brake mechanism of said wheel for deterring said slippage condition;

an electronic processing and control unit responsive to detection by said sensing means of said slippage condition for actuating said valve when activated; and a pressure sensitive switch operatively connected to said transmission and responsive to said selected modes of said transmission for activating said valve, said switch being directly operable on said valve and is actuated responsive to a fluid pressure of an automatic transmission corresponding to a preselected transmission range.

10. A device according to claim 9 wherein said pressure sensitive switch is a manometric switch.

* * * * *